United States Patent
Alexander et al.

(10) Patent No.: US 11,665,161 B2
(45) Date of Patent: May 30, 2023

(54) IDENTITY SERVICES FOR PASSWORDLESS AUTHENTICATION

(71) Applicant: Cisco Technology, Inc., San Jose, CA (US)

(72) Inventors: Eldridge Lee Alexander, Ann Arbor, MI (US); James Leslie Barclay, Ann Arbor, MI (US); Nicholas James Mooney, Ann Arbor, MI (US); Mujtaba Hussain, Canton, MI (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 549 days.

(21) Appl. No.: 16/444,036

(22) Filed: Jun. 18, 2019

(65) Prior Publication Data
US 2020/0403993 A1 Dec. 24, 2020

(51) Int. Cl.
*H04L 9/40* (2022.01)
*H04L 9/08* (2006.01)

(52) U.S. Cl.
CPC ........ *H04L 63/0884* (2013.01); *H04L 9/0897* (2013.01)

(58) Field of Classification Search
None
See application file for complete search history.

(56) References Cited

U.S. PATENT DOCUMENTS 9,152,781 B2 10/2015 Sowatskey
9,191,394 B2 * 11/2015 Novak .................. H04L 63/102
9,264,423 B2 2/2016 Cox
9,503,452 B1 * 11/2016 Kumar ................. H04L 63/0838
9,537,661 B2 * 1/2017 Khalil ................... H04L 9/3268
(Continued)

FOREIGN PATENT DOCUMENTS

EP 2887615 A1 * 6/2015 ......... H04L 63/0838

OTHER PUBLICATIONS

Unknown, "Single sign-on to applications in Azure Active Directory", Microsoft Azure, 7 pages, downloaded from Internet Jun. 18, 2019, https://docs.microsoft.com/en-us/azure/active-directory/manage-apps/what-is-single-sign-on.
(Continued)

*Primary Examiner* — Arezoo Sherkat
(74) *Attorney, Agent, or Firm* — Edell, Shapiro & Finnan, LLC

(57) ABSTRACT

An identity server authenticates a first user identity for a user device through a first authentication exchange as part of a passwordless authentication system. The identity server registers with a relying party as an authenticator for a second user identity. The identity server initiates a second authentication exchange by obtaining from the relying party, a credential request associated with the second user identity. Responsive to a determination that the first user identity authenticated in the first authentication exchange is authorized to act as the second user identity, the identity server obtains a credential request response authenticated by the authenticator in the identity server. The identity server completes the second authentication exchange by providing the credential response to the relying party. The second authentication exchange authenticates the user device to the relying party without involving the user device.

17 Claims, 7 Drawing Sheets

(56) References Cited

U.S. PATENT DOCUMENTS

| | | | |
|---|---|---|---|
| 10,764,752 B1* | 9/2020 | Avetisov | H04W 12/08 |
| 10,873,468 B2* | 12/2020 | Melo | H04L 9/0825 |
| 10,880,312 B1* | 12/2020 | Mesard | H04L 63/102 |
| 2008/0021866 A1* | 1/2008 | Hinton | G06Q 10/10 |
| 2013/0117554 A1* | 5/2013 | Ylonen | H04L 9/0891 |
| | | | 713/151 |
| 2014/0157381 A1* | 6/2014 | Disraeli | H04L 63/0853 |
| | | | 726/7 |
| 2015/0006882 A1 | 1/2015 | Hernandez et al. | |
| 2015/0082411 A1 | 3/2015 | Hook et al. | |
| 2015/0180869 A1* | 6/2015 | Verma | H04L 63/0861 |
| | | | 726/4 |
| 2015/0222604 A1* | 8/2015 | Ylonen | H04L 9/3263 |
| | | | 713/171 |
| 2018/0191501 A1* | 7/2018 | Lindemann | H04L 9/0833 |
| 2018/0191695 A1* | 7/2018 | Lindemann | H04L 63/0853 |
| 2019/0182237 A1* | 6/2019 | Queralt | H04L 9/3263 |
| 2019/0207928 A1* | 7/2019 | Bhargava | H04L 63/0884 |
| 2020/0007532 A1* | 1/2020 | Alexander | H04W 12/06 |
| 2020/0067922 A1* | 2/2020 | Avetisov | H04L 63/18 |
| 2020/0213310 A1* | 7/2020 | Ju | H04L 63/0876 |
| 2020/0358822 A1* | 11/2020 | Erickson | H04L 63/0823 |
| 2021/0044976 A1* | 2/2021 | Avetisov | H04L 9/321 |
| 2021/0383363 A1* | 12/2021 | Smirnov | G06Q 20/405 |

OTHER PUBLICATIONS

Unknown, "Okta Single Sign-On (SSO) Developed for Agility", Okta, 2 pages, downloaded from Internet Jun. 18, 2019, https://www.content.shi.com/SHIcom/ContentAttachmentImages/SharedResources/PDFs/Okta/okta-022019-SSO-Datasheet.pdf.

* cited by examiner

IDENTITY SERVICES FOR PASSWORDLESS AUTHENTICATION

TECHNICAL FIELD

The present disclosure relates to identity based authentication between computing devices.

BACKGROUND

Passwordless authentication systems allow users to securely log in to publicly accessible servers by authenticating the user with a secure device instead of a remembered password, and assert their identity to systems with a strong cryptographic credential rather than a shared secret (e.g., a password). In one example, a passwordless authentication system allows a relying party (e.g., a web server) to request a credential from a client (e.g., a web browser). The credential request is passed to an authenticator (e.g., an application on a device held by the user, optionally using purpose-built secure hardware), which prompts the user to accept or deny use or creation of a credential bound to the authenticator and the relying party.

Role-based policies may be used to determine who can access which applications based on the authenticated role of the individual or group. Specific individuals or groups may be allowed to access specific applications or data based on properly authenticating into the role. Policy enforcement is generally performed by the relying parties, such as websites, leaving organizations little ability to set policies that apply to web properties that the organizations do not control.

In some role-based policy implementations, user accounts/identities may be shared among team members, for instance, to provide access to a company social media account. One approach for sharing a user account in a traditional, password-based authentication system requires a shared secret (e.g., a password) to be shared among all of the team members. Additionally, if the user account has two-factor authentication enabled, then the team members may share a physical token or enroll multiple authenticators. Password managers may obscure shared passwords from the end user, but the user device still receives the shared password, allowing the user to recover the shared password.

DESCRIPTION OF EXAMPLE EMBODIMENTS

Overview

Figure 1:
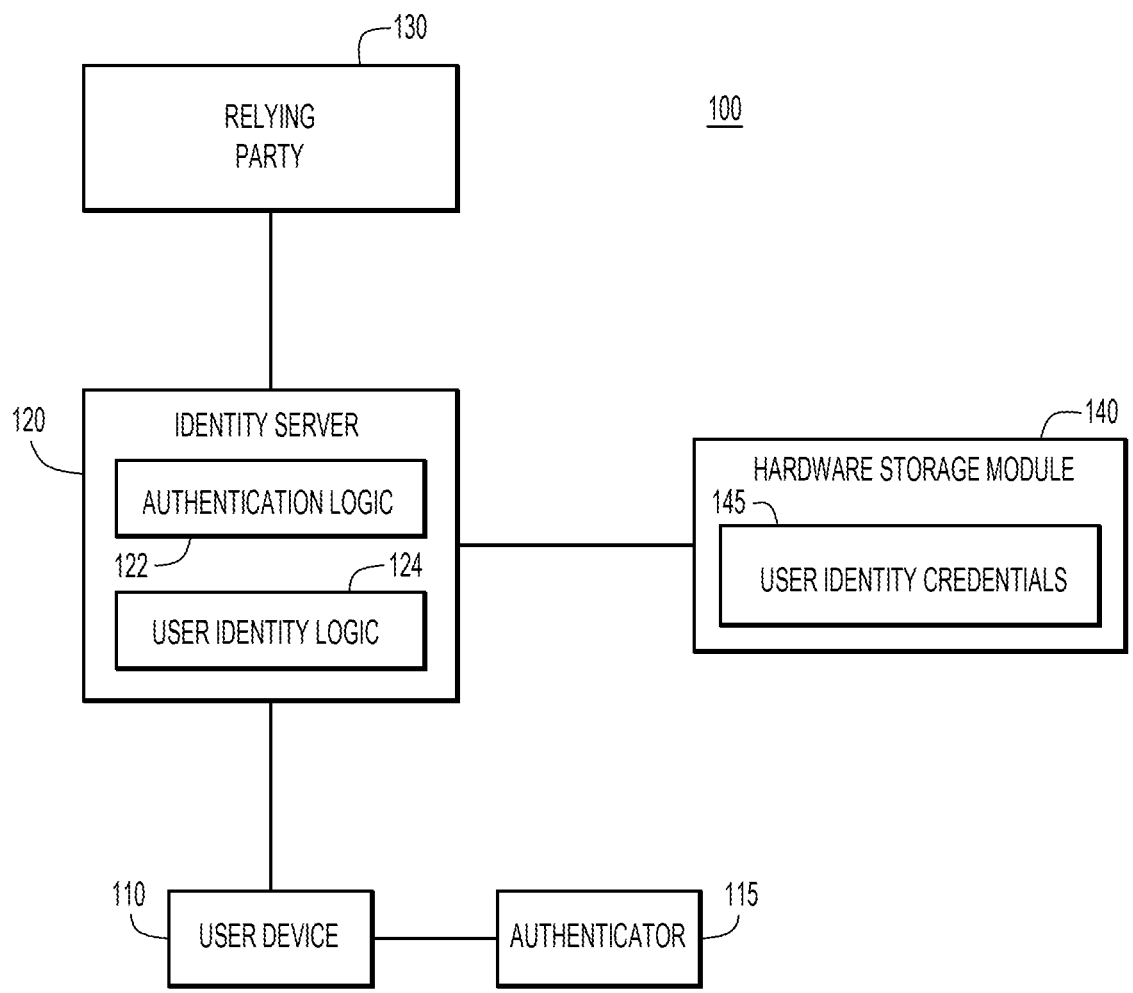
FIG. 1 is a simplified block diagram of an identity provider system configured to provide user devices with secure access to remote applications, according to an example embodiment.

A method is provided for authenticating a user device to a relying party via an identity server. The method includes authenticating a first user identity for the user device at the identity server through a first authentication exchange as part of a passwordless authentication system. The method also includes registering the identity server as an authenticator for a second user identity with the relying party. The method further includes initiating a second authentication exchange by obtaining from the relying party, a credential request associated with the second user identity. Responsive to a determination that the first user identity authenticated in the first authentication exchange is authorized to act as the second user identity, the method includes obtaining a credential request response authenticated by the authenticator in the identity server. The method also includes completing the second authentication exchange by providing the credential response to the relying party. The second authentication exchange authenticates the user device to the relying party without involving the user device.

Example Embodiments

To use a passwordless authentication system, a server (e.g., a web server) enrolls users with a username and relies on an authenticator (e.g., an application on a mobile device of the user) to confirm the identity of any client device that logs in with that username. The WebAuthn standard is used throughout the remainder of this application as one example of a passwordless authentication, but other authentication standards may also benefit from the techniques described herein.

In the WebAuthn standard, a relying party (e.g., a server hosting a remote application) communicates with an authenticator (e.g., a mobile hardware device or an application on a user's mobile device) through a client (e.g., a web browser on a user's computing device). The relying party registers a user the first time by sending a registration request to the client, and receiving a response that is signed by the authenticator. Subsequently, when the relying party logs in the registered user, the relying party sends a login request and receives a login response that is signed by the same authenticator. While the message flow of the registration exchange and the login exchange is the same, the content of the messages in each exchange is different.

Some remote service may not support WebAuthn or other passwordless authentication mechanisms. Additionally, some remote services that do support WebAuthn systems may have limitations in outside management, e.g., by an enterprise Information Technology (IT) department. The limits on outside management may present challenges to changing authenticators by the user.

In one example of the techniques presented herein, when a user registers for an account on a WebAuthn application (e.g., a relying party hosting the application), the authentication system may store the user's private cryptographic material (e.g., private keying material) in a secure location, such as a hardware security module, which the system accesses. When a user attempts to log in to the application, the user would use the WebAuthn Application Programming Interface (API) to log in to the authentication system, which determines whether the user's account is authorized for access to the account in the application (e.g., the relying party). If the user's account is authorized, then the authentication system would retrieve the private key material from the secure location and perform a WebAuthn authentication exchange with the destination application on the user's behalf. The exchange between the authentication system and the relying party may be transparent to the user.

These techniques provide advantages over both standard WebAuthn authentication and traditional Single Sign On (SSO) systems. Standard WebAuthn is typically limited by the user controlling the private key material, which may hinder a centralized IT department from administering credentials. Additionally, the techniques presented herein simplify account recovery for the end user by minimizing the need to register multiple authenticators or rely on identity-proofing for each relying party. Further, the techniques presented herein support any WebAuthn application with simply the user's login information, in contrast to traditional SSO applications, which require explicit integration for every application the enterprise wishes to support.

In one example, first credentials authenticating specific users may be mapped to second credentials authenticating user accounts to relying parties. The mapping may be a many-to-one mapping allowing multiple users authenticating with their own first credentials to use the same second credential for a relying party. In this example, an IT department may revoke a first credential (e.g., when an employee leaves an organization) without needing to rotate the second credential. The user of the now-revoked first credential was allowed access to the relying party based on the second credential, but never had access to the second credential itself.

In another example, the techniques presented herein provide for a WebAuthn-enabled identity provider with Role-Based Access Control capabilities. In this example, the identity provider differs from traditional Security Assertion Markup Language (SAML) identity providers by brokering credentials on behalf of the user, such that the credential private key may be generated and stored within an external Hardware Storage Module. Additionally, enterprise IT departments may perform Role-Based Access Control at the identity provider layer for WebAuthn credentials, enabling shared credentials without revealing the private key to users authenticating to the service.

When a user authenticates to a relying party using an account that is managed by the identity provider, the credential request (e.g., a WebAuthn assertion request) may be passed from the user device to the identity server. The user device may then authenticate with the identity server (e.g., via WebAuthn, password, etc.). If the user device is authorized to access the user account in the destination relying party, the identity server uses private key material from a secure hardware storage module to sign a credential response (e.g., a WebAuthn assertion) for the relying party on behalf of the user.

Referring now to FIG. 1, an authenticated identity system 100 is configured to provide authenticated user login information to a relying party without the authenticated user having access to the authenticated user login information. The system 100 includes a user device 110, which may be coupled to an authenticator 115. The user device 110 may be any type of computing device, such as a laptop computer, desktop computer, virtual machine, mobile device, etc. The authenticator 115 may be a hardware device (e.g., a dedicated security device) or software (e.g., an application) on a user's device (e.g., a mobile telephone).

The system 100 also includes an identity server 120 with authentication logic 122 and user identity logic 124. A relying party 130, such as a web server or a server providing a remote application, is also coupled to the identity server 120, which participates in the authentication exchange of the user device 110 to the relying party 130. The identity server 120 is coupled to a hardware storage module 140, which stores user identity credentials 145.

Figure 2A:
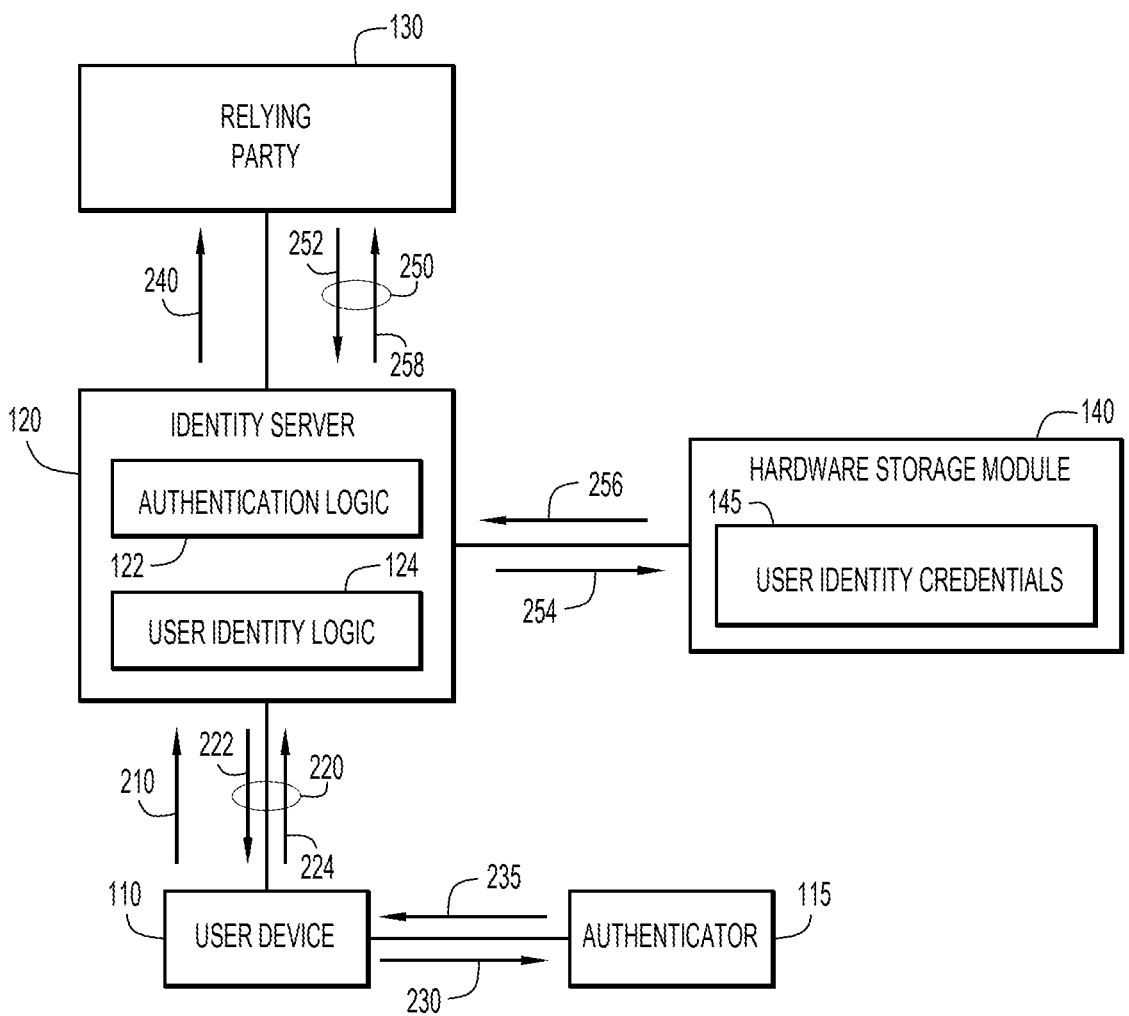
FIG. 2A is a message flow diagram illustrating a user device securely accessing a remote application from a relying party through an identity server, according to an example embodiment.

Referring now to FIG. 2A, a message flow diagram illustrates a user device 110 authenticating into a relying party 130 via an identity server 120. The user device sends a message 210 to the identity server 120 registering a passwordless authentication account (e.g., a WebAuthn account) for the user. In one example, the authenticator 115 is registered as the authenticator for the account, causing the identity server 120 to store a signed assertion from the authenticator 115. Subsequently, any time the user of the user device 110 wants to log in to any of the accounts managed by the identity server 120, the user device 110 and identity server 120 perform a first authentication exchange 220.

In the authentication exchange 220, the identity server 120 acts as a relying party to authenticate the user device 110. The identity server 120 sends a credential request 222 to the user device 110, which responds with a credential response 224 signed by the previously registered authenticator 115. The user device 110 obtains the signed credential response 224 by combining the credential request 222 with any required additional identity proofing data (e.g., Personal Identification Number (PIN), biometric data, etc.) and providing the combined message 230 to the authenticator 115. Alternatively, the identity proofing data may be provided directly to the authenticator 115 by the user, or the authenticator 115 may verify the user identity with an out-of-band mechanism. The authenticator 115 confirms the identity of the user, generates a credential response 235, and provides the credential response 235 to the user device 110, which the user device 110 forwards to the identity server 120 as the credential response 224.

To enable the user device 110 to access applications on the relying party 130, the identity server 120 sends a message 240 to the relying party 130 registering a passwordless authentication account (e.g., a WebAuthn account) for the user. In one example, the account may belong exclusively to the user of user device 110. Alternatively, the user account may be a group account to which the user of the user device 110 is assigned (e.g., a shared account for all employees working on a particular project). The message 240 may register the hardware storage module 140 as the authenticator for the account, causing the relying party 130 to store a signed assertion from the hardware storage module 140. Subsequently, if the identity server 120 needs to log in to the user account on behalf of a user, the identity server 120 and the relying party 130 perform a second authentication exchange 250. In one example, the message 240 and/or the second authentication exchange 250 between the identity server 120 and the relying party 130 may be mediated through the user device 110.

In the authentication exchange 250, the identity server 120 authenticates as the user to the relying party 130. The relying party 130 sends a message 252 with a credential request to the identity server 120, which provides the credential request in a message 254 to the hardware storage module 140. The hardware storage module generates a message 256 with a credential response authenticating the user account and provides the message 256 to the identity server 120. The identity server 120 sends a message 258 with the credential response to the relying party, completing the second authentication exchange.

In one example, the hardware storage module 140 may determine that the user device 110 has successfully authenticated with the identity server 120 before generating the credential response 256. In another example, one or more of the functions described as being performed by the hardware storage module (e.g., generating the credential request, determining the authentication of the user device 110, providing a signed assertion, etc.) may be performed by the identity server 120 in coordination with the hardware storage module 140. For instance, the hardware storage module 140 may provide the secure credentials to authenticate user accounts, and the identity server 120 generates and provides any authentication messages using the credentials provided by the hardware storage module 140.

Separating the authentication of the user device 110 to the relying party 130 into two separate authentication exchanges mediated by the identity server 120 may allow centralized IT management in which the hardware storage module 140 is accessible to a system administrator. The system administrator may have the ability to register a user for user accounts with multiple relying parties, while allowing the user to maintain an independent user account with access to any of the administrator-configured user accounts. The separation of authentication also enables an end user to change the authenticator device (e.g., authenticator 115) without needing to register the change with for each user account at each relying party.

Figure 2B:
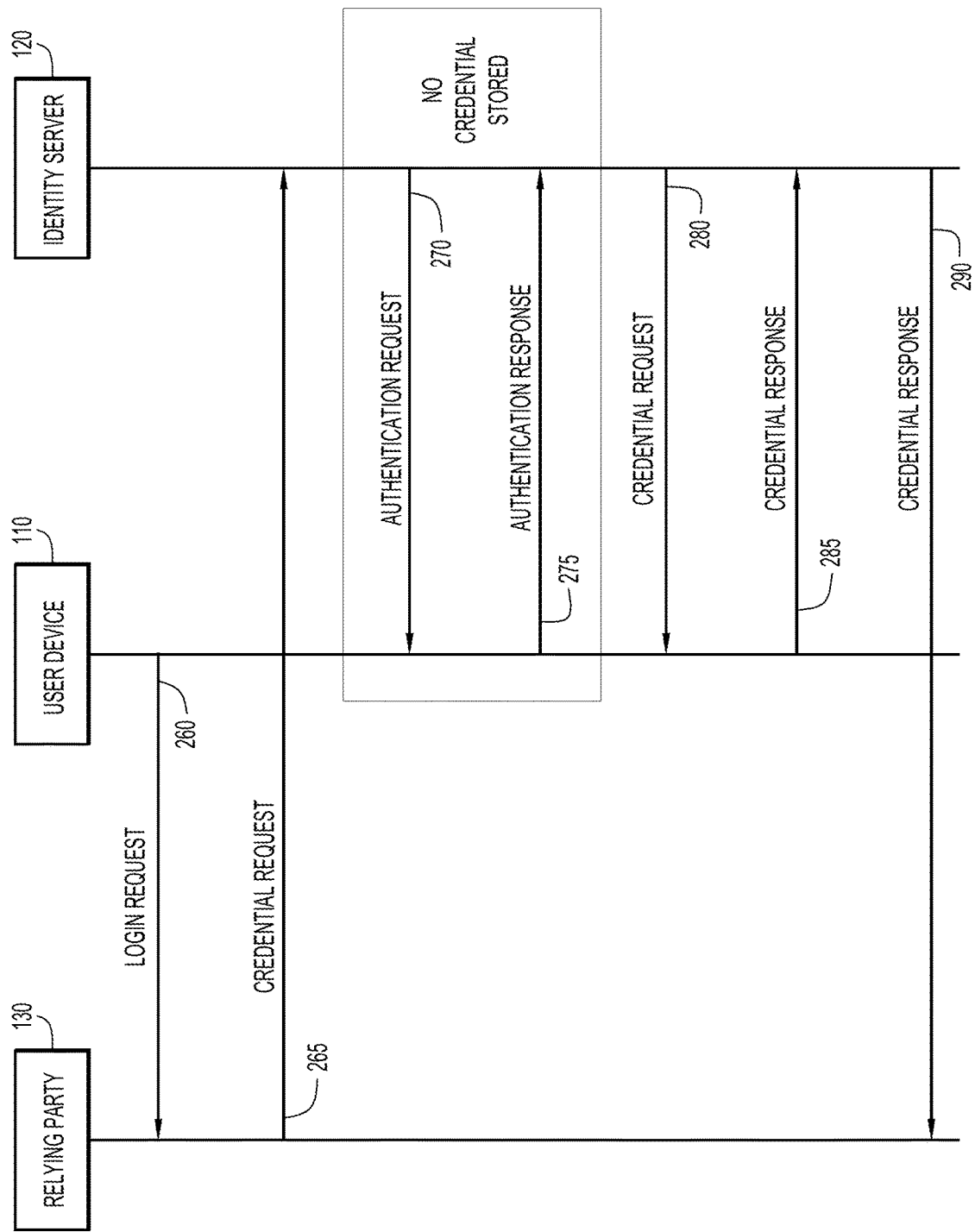
FIG. 2B is a messaging diagram illustrating a user device logging in to a relying party through an identity server, according to an example embodiment.

Referring now to FIG. 2B, a message flow diagram illustrates a user device 110 logging into a relying party 130 via an identity server 120. Initially, the user device 110 sends a login request 260 to the relying party 130. The login request 260 may include a user name for a user account. To authenticate the user device 110, the relying party 130 sends a credential request 265 to the identity server 120. In one example, the credential request 265 may be directed to the identity server 120 via the user device 110. In response to receiving the credential request 265, the identity server 120 verifies that the user device 110 is authorized to access the user account specified in the credential request 265.

If the identity server 120 has not previously stored a credential for authenticating the user account, then the identity server 120 sends an authentication request 270 to the user device 110. The user device 110 responds with an authentication response 275, which authenticates the user identity of the user device 110 to the identity server 120. Once the identity server 120 determines that the authenticated user identity of the user device 110 is authorized to authenticate the credential request 265 from the relying party 130, the identity server 120 sends a credential request 280 to the user device 110. The user device 110 generates a credential response 285 and sends the credential response 285 to the identity server 120. The identity server 120 processes the credential response 285 from the user device 110 and responds to the credential request 265 by sending a credential response 290 to the relying party 130, authenticating the user device 110 to the relying party 130.

If the identity server 120 has previously stored a local credential for authenticating the user account to the relying party 130, then the identity server 120 may skip the authentication exchange with the user device 110 (i.e., authentication request 270 and response 275) and simply forward the credential request 265 to the user device 110 as the credential request 280. If the credential response 285 matches the credential stored in the identity server 120, then the user device 110 is authenticated to the identity server 120. If the user device 110 is authorized to authenticate the credential response 265 for the relying party, then the identity server 120 sends the credential response 290 to the relying party 130, authenticating the user device 110 to the relying party 130.

Figure 3:
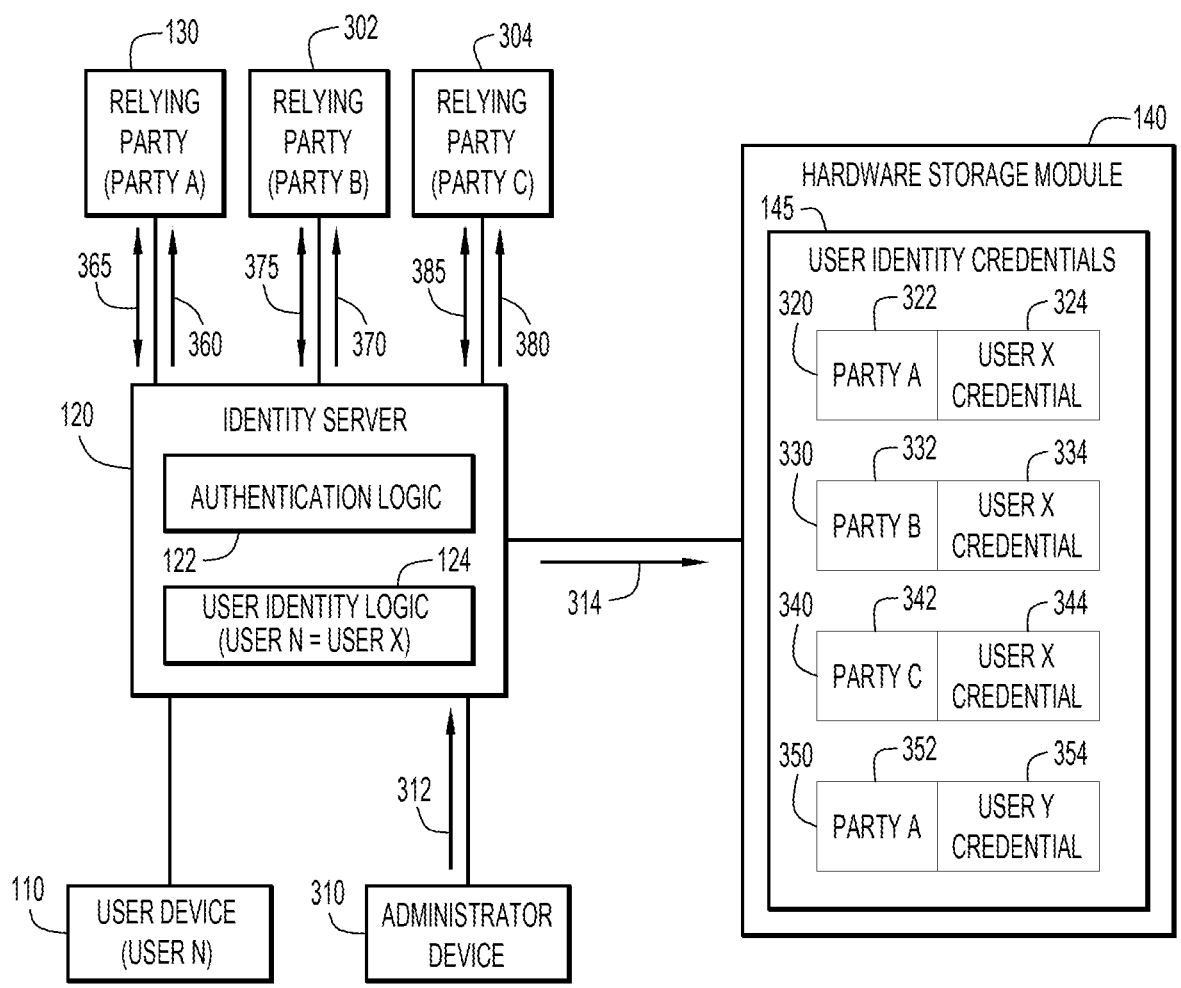
FIG. 3 is a message flow diagram illustrating an administrator device configuring secure credentials for a user device to access multiple relying parties, according to an example embodiment.

Referring now to FIG. 3, a message flow diagram illustrates an administrator registering a credentials for user accounts at a plurality of relying parties. In addition to being connected to relying party 130, as shown in FIG. 1 and FIG. 2A, the identity server 120 is also connected to relying party 302 and relying party 304. While only three relying parties are shown in FIG. 3, any number of relying parties may be supported with the techniques described herein. To enable a user device 110 (e.g., used by a user N), an administrator uses an administrator device 310 to send a message 312 to the identity server 120. The message 312 may include instructions to set up a user account at a specific relying party, credentials for a particular user to gain access to specific relying parties, and/or authorization for a particular user to act as another user (e.g., user N is authorized to access user accounts for user X, which may be a user group).

The identity server 120 provides a message 314 to the hardware storage module 140 to store the credentials from the message 312 in the hardware storage module 140. The credentials stored in the hardware storage module 140 include credential 320 comprising an indication 322 of the relying party (e.g., relying party A) and the actual credential 324 for a particular user (e.g., user X). The hardware storage module 140 also stores credential 330 comprising an indication 332 of the relying party (e.g., relying party B) and the actual credential 334 for a particular user (e.g., user X), credential 340 comprising an indication 342 of the relying party (e.g., relying party C) and the actual credential 344 for a particular user (e.g., user X), and credential 350 comprising an indication 352 of the relying party (e.g., relying party A) and the actual credential 354 for a particular user (e.g., user Y).

In one example, the identity server 120 may set up the user account with the relying party 130 according to a passwordless authentication protocol (e.g., WebAuthn). The identity server 120 sends a message 360 to the relying party 130 to register the user account with the hardware storage module 140 as the authenticator. The relying party 130 and the identity server 120 complete the registration of the user account in the authentication exchange 365 using a credential (e.g., credential 320 or 350) for the user account being configured on the relying party 130. Similarly, the identity server 120 may send a message 370 to the relying party 302 to register a user account, which is completed in the authentication exchange 375 using the appropriate credential (e.g., credential 330) for the user account on the relying party 302. Further, the identity server 120 may send a message 380 to the relying party 304 to register a user account, which is completed in the authentication exchange 385 using the appropriate credential (e.g., credential 340) for the user account on the relying party 304.

Alternatively, one or more of the relying parties (e.g., relying party 304) may not support passwordless authentication, and the associated credential (e.g., credential 340) may include alternative authentication information. For instance, the relying party 304 may rely on Security Assertion Markup Language (SAML) protocols to authenticate user accounts, or simply use a login/password combination. The hardware storage module 140 may store credentials in multiple protocols to transparently support any authentication mechanism supported by different relying parties. When accessing a desired application at a relying party, the end user may log in to the identity server 120 using a passwordless authentication mechanism (e.g., WebAuthn), and the identity server 120 may authenticate the user account using a different protocol that is supported by the relying party that the user is accessing. Separating the authentication of the user device 110 from the user account enables traditional applications that do not support passwordless authentication to be accessed without a password.

Figure 4:
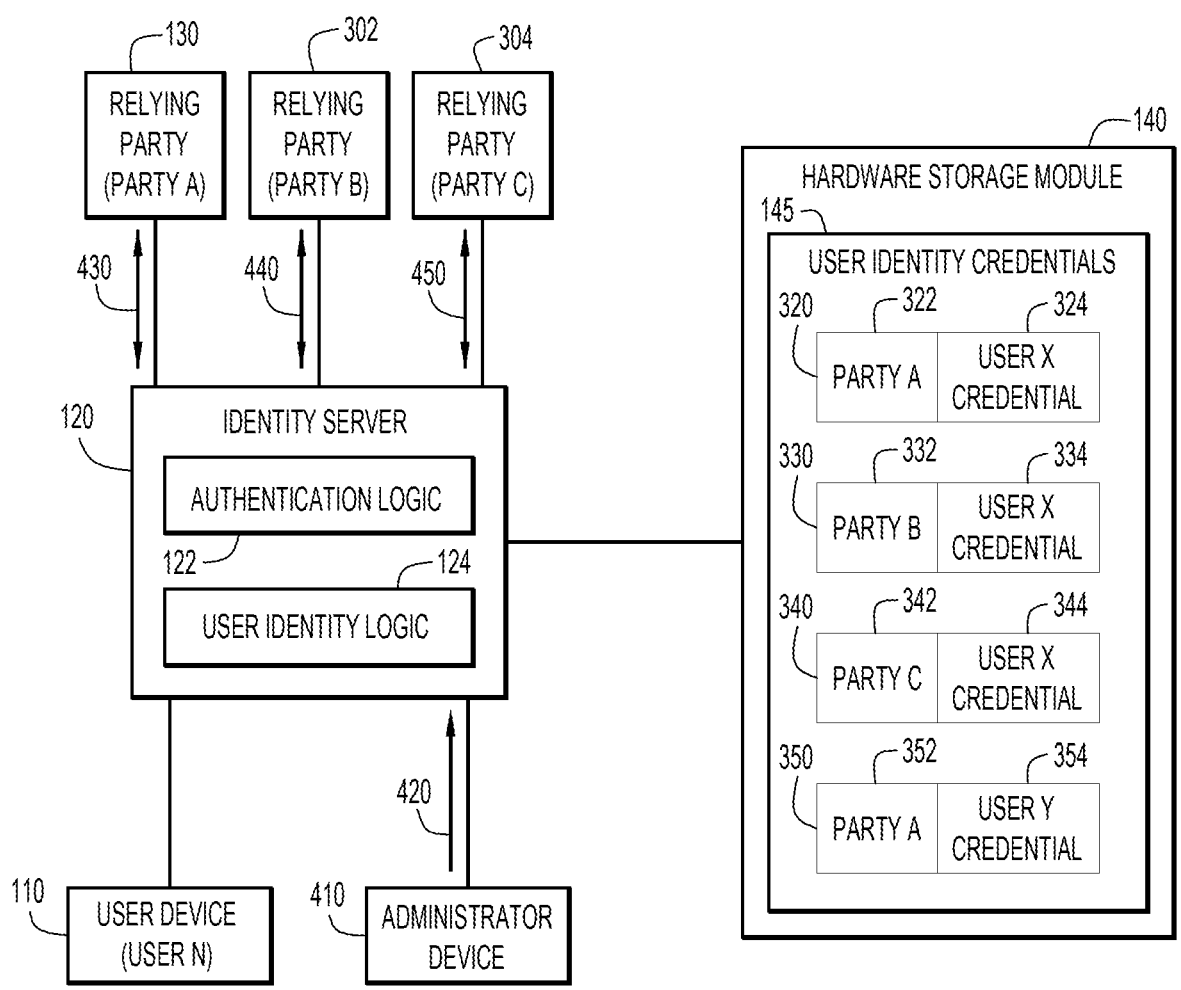
FIG. 4 is a message flow diagram illustrating an administrator device resetting multiple credentials for a user device, according to an example embodiment.

Referring now to FIG. 4, a message flow diagram illustrates an administrator device 410 resetting credentials for a user. In one example, to reset the credentials of a user, an administrator sends a message 420 from the administrator device 410 to the identity server 120. The message 420 may instruct the identity server 120 to remove the authority of a particular user (e.g., user N) to act as another user (e.g., a user group X), or to change the authority of the particular user to act as a different user (e.g., user Y).

In another example, the message 420 may instruct the identity server 120 to update the user accounts on relying parties 130, 302, and 304 through authentication exchanges 430, 440, and 450, respectively. The administrator device 410 may perform account recovery for each of the relying parties on behalf of the user device 110. By separating the authentication of the user device 110 and the relying parties 130, 302, and 304 at the identity server 120, the identity server 120 is able to transparently manage (e.g., reset credentials, recover accounts, etc.) all of the separate user accounts on each of the relying parties on behalf of the user device 110.

Figure 5:
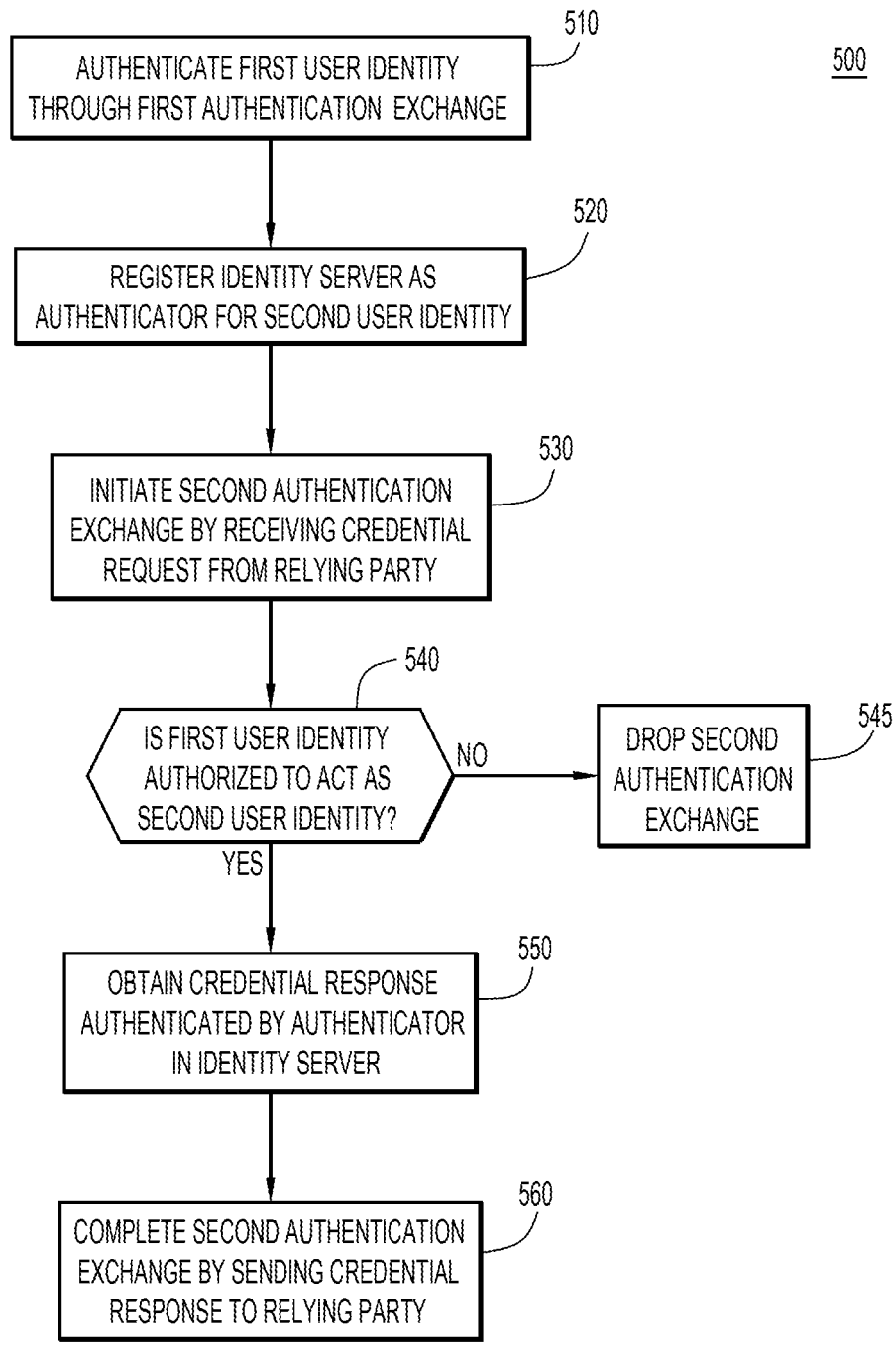
FIG. 5 is a flowchart illustrating operations of an identity server for authenticating a user device to a relying party based on authenticated user identities, according to an example embodiment.

Referring now to FIG. 5, a flowchart illustrates operations performed at a computing device (e.g., identity server 120) in a process 500 to manage user authentication (e.g., of particular user identities) for a relying party on behalf of a user device. At 510, the computing device authenticates a first user identity for a user device through a first authentication exchange. In one example, the first authentication exchange may be part of a passwordless authentication system, e.g., according to a WebAuthn protocol. In another example, the identity server may obtain/receive and store an indication of an authenticator of the user device, which is used to authenticate the first user identity in the first authentication exchange of the passwordless authentication exchange.

At 520, the identity registers as an authenticator for a second user identity with a relying party. In one example, the identity server may register as an authenticator for one or more user identities with one or more relying parties. At 530, the identity server initiates a second authentication exchange by receiving from the relying party, a credential request associated with the second user identity. In one example, the user device triggers the relying party to provide/send the credential request to the identity server.

At 540, the identity server determines whether the first user identity, which was authenticated in the first authentication exchange, is authorized to act as the second user identity. If the first user identity is not authorized to act as the second user identity, then the identity server drops the second authentication exchange at 545. If the first user identity is authorized to act as the second user identity, then the identity server obtains a credential response authenticated by the authenticator in the identity server at 550. In one example, the credential response is a WebAuthn response signed by the authenticator registered at 520. Alternatively, the credential response may include cryptographic material confirming the second user identity separate according to other security protocols (e.g., SAML). At 560, the identity server completes the second authentication exchange by providing/sending the credential response to the relying party. The credential response from the identity server enables the second authentication exchange to authenticate the user device to the relying party without involving the user device.

Figure 6:
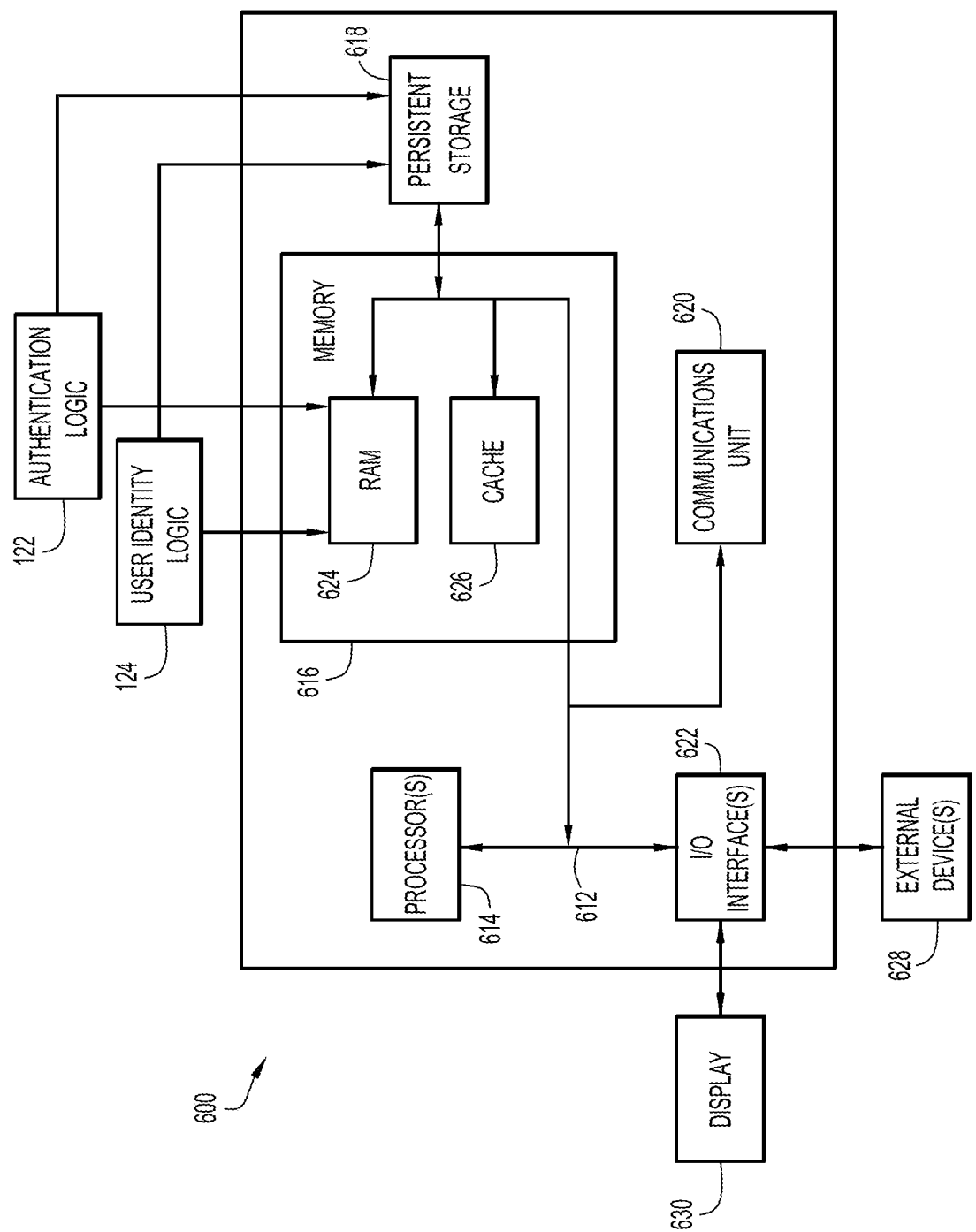
FIG. 6 illustrates a simplified block diagram of a device that may be configured to perform methods presented herein, according to an example embodiment.

Referring now to FIG. 6, a hardware block diagram illustrates a computing device 600 that may perform the functions of any of the servers or computing or control entities referred to herein in connection with the authentication system described herein. It should be appreciated that FIG. 6 provides only an illustration of one embodiment and does not imply any limitations with regard to the environments in which different embodiments may be implemented. Many modifications to the depicted environment may be made.

As depicted, the device 600 includes a bus 612, which provides communications between computer processor(s) 614, memory 616, persistent storage 618, communications unit 620, and input/output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media. In the depicted embodiment, memory 616 includes random access memory (RAM) 624 and cache memory 626. In general, memory 616 can include any suitable volatile or non-volatile computer readable storage media. Instructions for the authentication logic 122 and/or the user identity logic 124 may be stored in memory 616 or persistent storage 618 for execution by processor(s) 614.

One or more programs may be stored in persistent storage 618 for execution by one or more of the respective computer processors 614 via one or more memories of memory 616. The persistent storage 618 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices. In these examples, communications unit 620 includes one or more network interface units, such as network interface cards. Communications unit 620 may provide communications through the use of either or both physical and wireless communications links.

I/O interface(s) 622 allows for input and output of data with other devices that may be connected to computer device 600. For example, I/O interface 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to user identities or credentials). The database system may be included within or coupled to the server and/or client systems. The database systems and/or storage structures may be remote from or local to the computer or other processing systems, and may store any desired data (e.g., data relating to user authentication/authorization or credentials).

The present embodiments may employ any number of any type of user interface (e.g., Graphical User Interface (GUI), command-line, prompt, etc.) for obtaining or providing information (e.g., data relating to user authentication/authorization or credentials), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In summary, the techniques presented herein enable authentication in a passwordless environment for services that may not support passwordless operation. Additionally, the techniques presented herein allow passwordless authentication using standardized WebAuthn protocols while allowing additional enterprise management features to IT administrators. Further, the techniques presented herein provide an account recovery mechanism that does not require the end user to enroll multiple authenticators, and relies on the identity server to handle the credentials and account recovery for multiple relying parties.

In one form, a method is provided for authenticating a user device to a relying party via an identity server. The method includes authenticating a first user identity for the user device at the identity server through a first authentication exchange as part of a passwordless authentication system. The method also includes registering the identity server as an authenticator for a second user identity with the relying party. The method further includes initiating a second authentication exchange by obtaining from the relying party, a credential request associated with the second user identity. Responsive to a determination that the first user identity authenticated in the first authentication exchange is authorized to act as the second user identity, the method includes obtaining a credential request response authenticated by the authenticator in the identity server. The method also includes completing the second authentication exchange by providing the credential response to the relying party. The second authentication exchange authenticates the user device to the relying party without involving the user device.

In another form, an apparatus comprising a network interface, a hardware storage module, and a processor is provided. The network interface is configured to communicate with a user device and a relying party across one or more computer networks. The hardware storage module in configured to store private cryptographic The processor is configured to authenticate a first user identity for the user device at an identity server through a first authentication exchange as part of a passwordless authentication system. The processor is also configured to register the identity server as an authenticator for a second user identity with the relying party. The processor is further configured to initiate a second authentication exchange by obtaining from the relying party via the network interface, a credential request associated with the second user identity. Responsive to a determination that the first user identity authenticated in the first authentication exchange is authorized to act as the second user identity, the processor is configured to obtain a credential response authenticated by the authenticator in the identity server. The processor is also configured to complete the second authentication exchange by causing the network interface to provide the credential response to the relying party. The second authentication exchange authenticates the user device to the relying party without involving the user device.

In yet another form a non-transitory computer readable storage media is provided that is encoded with instructions that, when executed by a processor of an identity server, cause the processor to authenticate a first user identity for a user device through a first authentication exchange as part of a passwordless authentication system. The instructions also cause the processor to register the identity server as an authenticator for a second user identity with a relying party. The instructions further cause the processor to initiate a second authentication exchange by obtaining from the relying party, a credential request associated with the second user identity. Responsive to a determination that the first user identity authenticated in the first authentication exchange is authorized to act as the second user identity, the instructions cause the processor to obtain a credential response authenticated by the authenticator in the identity server. The instructions also cause the processor to complete the second authentication exchange by providing the credential response to the relying party. The second authentication exchange authenticates the user device to the relying party without involving the user device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the presented embodiments.

Aspects of the present embodiments are described herein with reference to flowchart illustrations and/or block diagrams of methods, apparatus (systems), and computer program products according to presented embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various presented embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   obtaining a registration of a first authenticator for a first account at an identity server as part of a passwordless authentication system;
   authenticating the first account for a user device at the identity server through a first authentication exchange between the identity server and the user device;
   registering a hardware storage module coupled to the identity server as a second authenticator for a second account with a relying party without involving the user device, the second account separate from the first account;
   providing a signed assertion from the hardware storage module to the relying party;
   initiating a second authentication exchange between the identity server and the relying party by obtaining from the relying party, a credential request associated with the second account;
   responsive to a determination that the first account authenticated in the first authentication exchange is authorized to act as the second account based on the first account being assigned to a role associated with the second account, providing the credential request to the hardware storage module for authentication;
   obtaining a credential response authenticated by the hardware storage module for the second account in the identity server; and
   completing the second authentication exchange by providing the credential response from the hardware storage module to the relying party through the identity server, wherein the second authentication exchange authenticates the user device to the relying party without involving the user device.

2. The method of claim 1, further comprising registering the hardware storage module as the second authenticator for a plurality of relying parties in the passwordless authentication system.

3. The method of claim 1, further comprising storing private cryptographic information associated with the second account in the hardware storage module coupled to the identity server.

4. The method of claim 3, further comprising updating the private cryptographic information associated with the second account.

5. The method of claim 1, further comprising, obtaining from the user device, the registration of the first authenticator for the first account in the passwordless authentication system.

6. The method of claim 1, wherein the passwordless authentication system is configured according to WebAuthn standards.

7. An apparatus comprising:
   a network interface configured to communicate, on behalf of an identity server, with a user device and a relying party across one or more computer networks;
   a hardware storage module configured to store private cryptographic information; and
   a processor coupled to the network interface and the hardware storage module, the processor configured to:
   obtain a registration of a first authenticator for a first account at the identity server as part of a passwordless authentication system;
   authenticate the first account for the user device at the identity server through a first authentication exchange between the identity server and the user device;
   register the hardware storage module as a second authenticator for a second account with the relying party without involving the user device, the second account separate from the first account;

cause the network interface to provide a signed assertion from the hardware storage module to the relying party;

initiate a second authentication exchange between the identity server and the relying party by obtaining from the relying party via the network interface, a credential request associated with the second account;

responsive to a determination that the first account authenticated in the first authentication exchange is authorized to act as the second account based on the first account being assigned to a role associated with the second account, provide the credential request to the hardware storage module;

obtain a credential response authenticated by the hardware storage module for the second account in the identity server; and complete the second authentication exchange by causing the network interface to provide the credential response from the hardware storage module to the relying party through the identity server, wherein the second authentication exchange authenticates the user device to the relying party without involving the user device.

8. The apparatus of claim 7, wherein the processor is further configured to register the hardware storage module as the second authenticator for a plurality of relying parties in the passwordless authentication system.

9. The apparatus of claim 7, wherein the processor is further configured to store private cryptographic information associated with the second account in the hardware storage module.

10. The apparatus of claim 9, wherein the processor is further configured to update the private cryptographic information associated with the second account.

11. The apparatus of claim 7, wherein the processor is further configured to obtain from the user device via the network interface, the registration of the first authenticator for the first account in the passwordless authentication system.

12. The apparatus of claim 7, wherein the passwordless authentication system is configured according to WebAuthn standards.

13. One or more non-transitory computer readable storage media encoded with instructions that, when executed by a processor of an identity server, cause the processor to:

obtain a registration of a first authenticator for a first account at the identity server as part of a passwordless authentication system;

authenticate the first account for a user device through a first authentication exchange between the identity server and the user device;

register a hardware storage module coupled to the identity server as a second authenticator for a second account with a relying party without involving the user device, the second account separate from the first account;

providing a signed assertion from the hardware storage module to the relying party;

initiate a second authentication exchange between the identity server and the relying party by obtaining from the relying party, a credential request associated with the second account;

responsive to a determination that the first account authenticated in the first authentication exchange is authorized to act as the second account based on the first account being assigned to a role associated with the second account, providing the credential request to the hardware storage module for authentication;

obtain a credential response authenticated by the hardware storage module for the second account in the identity server; and complete the second authentication exchange by providing the credential response from the hardware storage module to the relying party through the identity server, wherein the second authentication exchange authenticates the user device to the relying party without involving the user device.

14. The non-transitory computer readable storage media of claim 13, further comprising instructions operable to cause the processor to register the hardware storage module as the second authenticator for a plurality of relying parties in the passwordless authentication system.

15. The non-transitory computer readable storage media of claim 13, further comprising instructions operable to cause the processor to store private cryptographic information associated with the second account in the hardware storage module coupled to the identity server.

16. The non-transitory computer readable storage media of claim 15, further comprising instructions operable to cause the processor to update the private cryptographic information associated with the second account.

17. The non-transitory computer readable storage media of claim 13, further comprising instructions operable to cause the processor to obtain from the user device, the registration of the first authenticator for the first account in the passwordless authentication system.

* * * * *